Nov. 1, 1966 H. E. DE BOLT 3,283,205
SHIFTING ARC PLASMA SYSTEM
Filed June 1, 1961 3 Sheets-Sheet 2

HAROLD E. DeBOLT
INVENTOR.

BY
ATTORNEYS

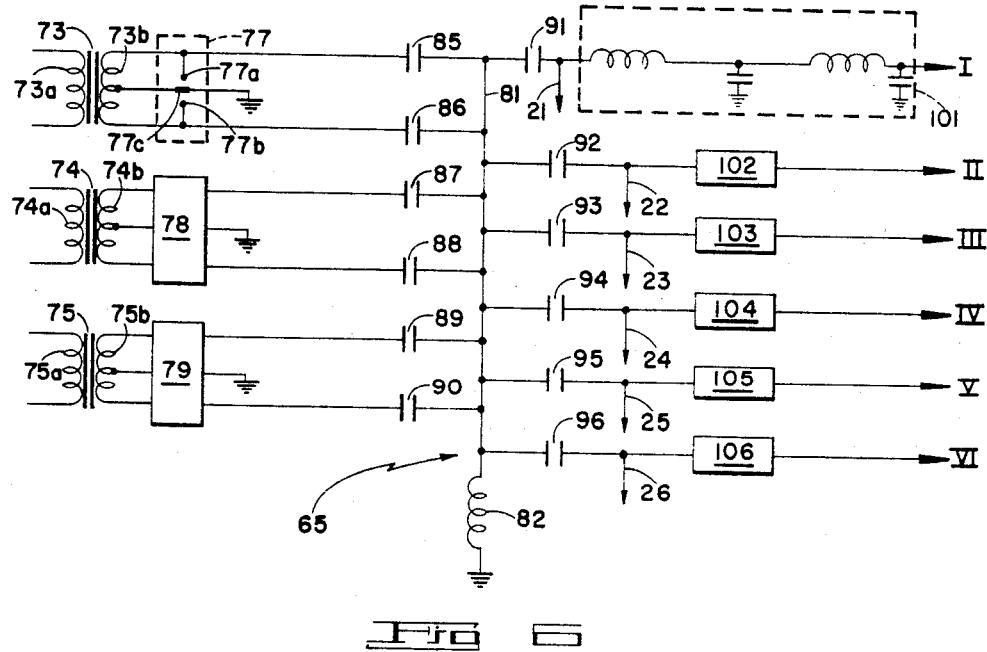
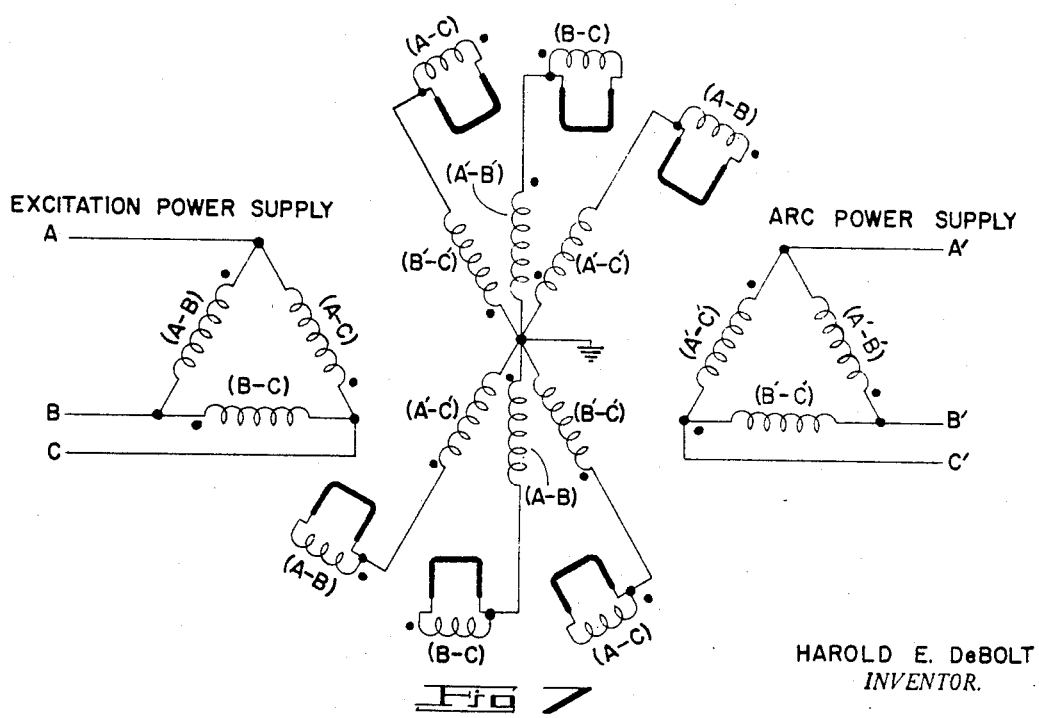

United States Patent Office 3,283,205
Patented Nov. 1, 1966

3,283,205
SHIFTING ARC PLASMA SYSTEM
Harold E. De Bolt, 79 Wildwood Road, Andover, Mass.
Filed June 1, 1961, Ser. No. 114,154
29 Claims. (Cl. 315—111)

This invention relates, generally, to arc plasma devices and systems and, in particular, to such devices and systems where power for striking and maintaining an arc is derived from alternating current or interrupted uni-directional current (D.C.) power supplies.

As used herein, the term arc is defined as a self sustaining gas discharge in the general pressure range above 1/20 of an atmosphere and generally in the current range of several to thousands of amperes. Cobine, on pages 290 and 326 of Gaseous Conductors (1958), calls a discharge having the above defined characteristics a high pressure arc.

The term plasma, as used herein, is defined as an electrically neutral mass of fluid, usually gas, which contains free electrons and ions created by the dissociation of the fluid, in addition to neutral atoms and/or molecules of the fluid. Plasma, when associated with an electric arc as defined above, exhibits intense chemical activity; regions of the plasma are at extremely high temperatures often in the region of 10,000 to 30,000° F.

Plasma is created by the interaction of a gas and an arc flowing through the gas. Phrased differently, the gas acts as the conductor for the arc current. An energy transfer occurs between the electric arc and the gas through which the arc is flowing. As a result of energy transfer, the gas is heated to extremely high temperatures. Portions of the gas dissociate into electrons and ions and establish a plasma.

Plasma, derived from arcs as discussed above, is used in welding implements and plasma cutting tools as well as plasma generating devices that generate high temperature plasma effluents. An excellent example of a plasma generating device is shown in the Rava Patent, 2,768,279. An arc plasma device for cutting is described in the Cresswell et al. Patent, 2,908,798.

For the most part, equipments for generating plasma are supplied with direct current power, in spite of the fact that the cost of converting apparatus—for converting alternating current power from the power mains into direct current power—is very high.

It is an object of the invention to provide arc plasma devices and systems which avoid the limitations and disadvantages of such prior devices and systems.

It is another object of the invention to provide new and improved arc plasma devices and systems which operate with alternating current and interrupted direct current power supply means, as well as continuous direct current power supply means.

It is yet another object of the invention to provide arc plasma devices and systems which include means tending to prevent an arc from rooting on electrodes, thus extending electrode life.

It is still another object of the invention to provide arc plasma devices and systems for generating a high enthalpy plasma effluent.

It is still another object of the invention to provide arc plasma devices and systems which include means which tend to make a plasma effluent more uniform in character.

It is yet another object of the invention to provide arc plasma devices and systems in which a working gas may be made to pass through one or more arcs before emerging as a plasma effluent.

It is yet another object of the invention to provide arc plasma devices and systems which generate and operate with a succession of arcs.

It is still another object of the invention to provide arc plasma devices and systems which include means for moving an arc for increasing the arc length.

It is still another object of the invention to provide arc plasma devices and systems which include separate and distinct current means for moving an arc and for supplying arc current.

It is yet another object of the invention to provide arc plasma devices and systems using magnetic means for moving the arc, but without the arc movement generating rotation forces on the working gas and plasma.

In accordance with the invention an arc plasma system includes means for supplying a stream of fluid. Preferably, the fluid comprises a gas such as air, hydrogen, argon, etc. Also included, are spaced electrode means in communication with the fluid stream. An arc power supply means is coupled to each of the electrodes for supplying current to arcs struck between the electrodes. An excitation power supply means is also coupled to the electrodes for supplying current into and out of each electrode for developing a magnetic field. The magnetic field interacts with an arc supplied by the arc power supply to develop a force tending to move the arcs longitudinally through the stream of fluid.

An arc plasma device embodying the principles of the invention comprises spaced electrode means in communication with means for providing a stream of fluid, preferably gas, through which an arc will flow. Means for coupling the electrodes to an arc power supply for supplying current to an arc developed across two or more electrodes is also provided. The electrodes are arranged to have an increasing, diverging separation and means for coupling electric current into and out of each electrode to generate a magnetic field tending to move an arc in a direction tending to lengthen the arc, i.e., in the direction in which the spacing between electrodes increases.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 6 is a schematic representation of a pulse starting system; and

FIGURE 7 is a schematic representation of an illustrative power supply means.

Figure 1:
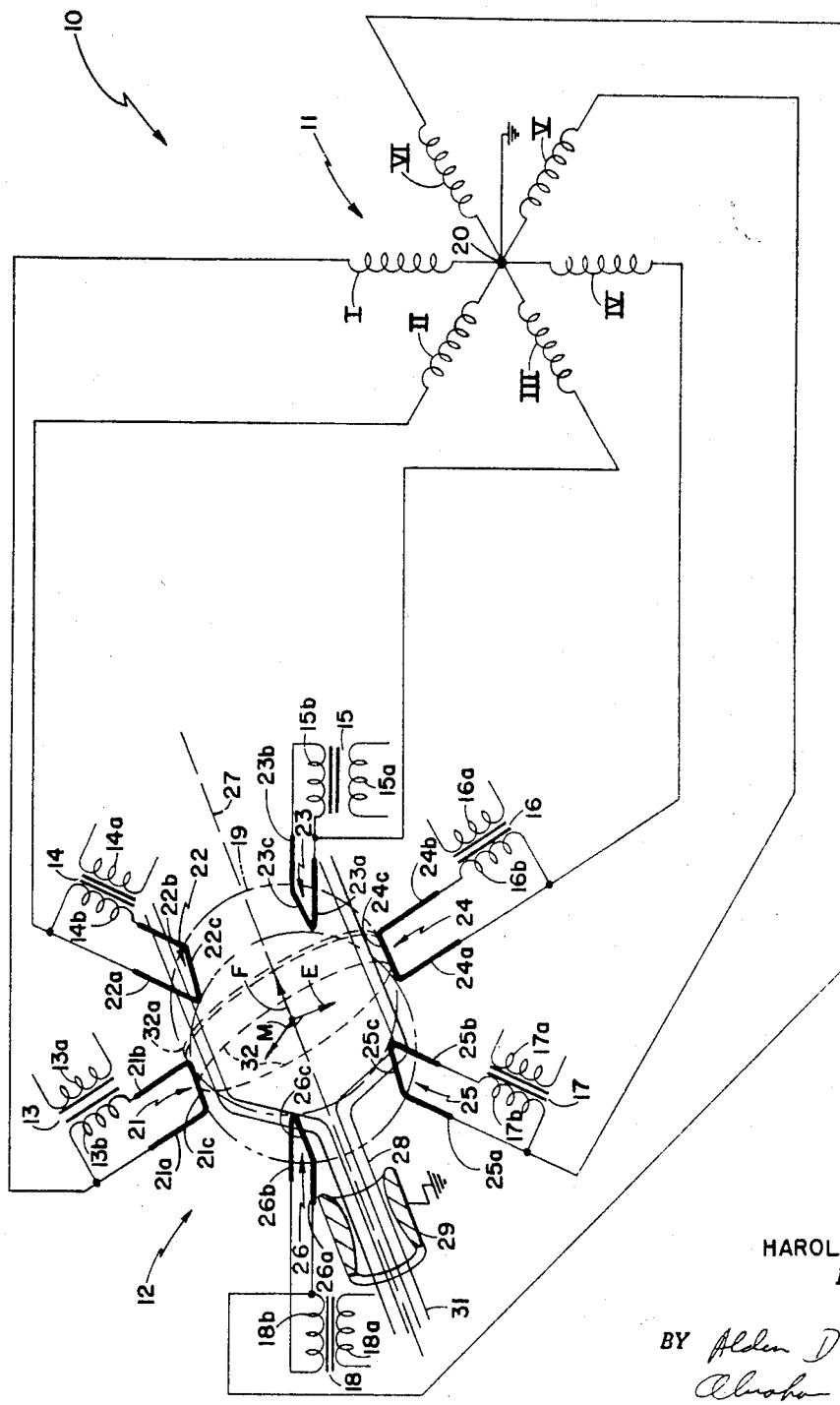
FIGURE 1 is an arc plasma system embodying the principles of the present invention depicted schematically.

Referring to FIGURE 1 of the drawings, there is represented an arc plasma system 10 comprising an arc power supply means 11, an arc plasma device 12 shown in schematic form, and an excitation power supply means comprising transformers 13 through 18, having primary windings 13a through 18a and secondary windings 13b through 18b. The arc power supply means 11 and the excitation power supply means 14 are related in phase but otherwise operate independently.

The arc power supply 11 is shown as a conventional six phase star supply. The phases have been designated with the Roman numbers I through VI, progressing in a counterclockwise direction. The junction 20 of phases I–VI is grounded. The arc plasma device 12 comprises a plurality of electrodes preferably in a symmetrical configuration. For the six phase structure illustrated in FIGURE 1, the arc plasma device 12 comprises six U-shaped electrodes 21 through 26. Each electrode is spaced uniformly with respect to adjacent electrodes and in combination form a circular configuration about a central axis 27. In practice, electrodes 21–26 are secured to a cylindrical housing shown symbolically at 19. Each of the electrodes 21 through 26 comprises a pair of radially extending fingers carrying an "a" and "b" designation in addition to the numerical designation of the electrode with which the fingers are associated. The "a" and "b" fingers are joined by a bight carrying a "c" designation. The bights "c" are parallel, in all cases, to the central axis 27. Accordingly, each electrode 21 through 26 lies in a radial plane with respect to the central axis 27. Electrodes 21 through 26 are coupled to phases I through VI, respectively, of the arc power supply 11.

It will be noted that the junction of a bight "c" and the "a" and "b" fingers of electrodes 21 through 26 are rounded off. Thus, the spacing between electrodes increases at these junctions. The increased spacing, as will become apparent hereinafter, is beneficial.

As seen in FIGURE 1, one secondary winding 13b through 18b of the transformers 13 through 18 is coupled to one of the electrodes 21 through 26. Transformers 13 through 18 provide current into and out of each electrode 21 through 26. The current path with respect to electrode 21, which is typical, is as follows:

Current leaves transformer 13, enters finger 21a, passes through bight 21c to finger 21b, and finally returns to transformer 13. Transformers 13 through 18 are alternating current devices. Therefore, while the current path just descibed will remain the same, the direction of current flowing in the path will reverse each half cycle in synchronism with phase reversals in transformers 13 through 18.

Schematic representations of a working gas 28 passing over the electrodes 21 through 26 and out through a nozzle 29, are also portrayed in FIGURE 1. To distinguish between the working gas within the arc plasma device 12 and the gas leaving the arc plasma device 12, the latter will be referred to as an effluent 31.

THEORY OF OPERATION

As is well known, the six phase arc power supply 11, coupled to electrodes as shown in FIGURE 1, will generate a rotating electric field about the central axis 27. The arrow E in FIGURE 1 represents an instantaneous position of the rotating electric field intensity, usually the maximum electric field intensity.

As was pointed out previously, the transformers 13 through 18 cause a current to flow into and out of electrodes 21 through 26, respectively. Current flowing through the electrodes creates a magnetic field which rings the electrodes. The phase relationship of the excitation power supply, comprising transformers 13 through 18, is such that a rotating magnetic field M, preferably perpendicular, but having at least a perpendicular component to central axis 27, is generated. The phasing is adjusted so that the magnetic field M is perpendicular, or includes a substantial perpendicular component, to the rotating electric field E at all times.

In a conventional manner, when an arc is struck it will flow in the direction of the electric field E in FIGURE 1 between electrodes 21 and 24. Thus, there is set up within the arc plasma device 12 a situation wherein an electric current comprising an arc 32, shown in dotted outline, is caused to flow through a magnetic field M in a direction perpendicular to the magnetic field M. The fundamental force relationship $$J \times B = \text{Force} \qquad (1)$$

where J is the current density of the arc and B is the magnetic field density comes into play and a force F acting on the arc 32 in a direction along the central axis 27 is created. Accordingly, the arc is pushed in the direction of the central axis 27. The direction of the force F is determined by the relative directions of the electric field E and the magnetic field M. In FIGURE 1 the force F is shown directed upstream against the flow of the working gas 28. The flow of working gas refers to the advancement of the stream of working gas through the arc plasma device 12; it does not refer to either regular or random internal currents. Where the electric field E, and consequently the arc 32, and the magnetic field M are maintained in a perpendicular relationship, the force F will be directed axially.

Figure 2:
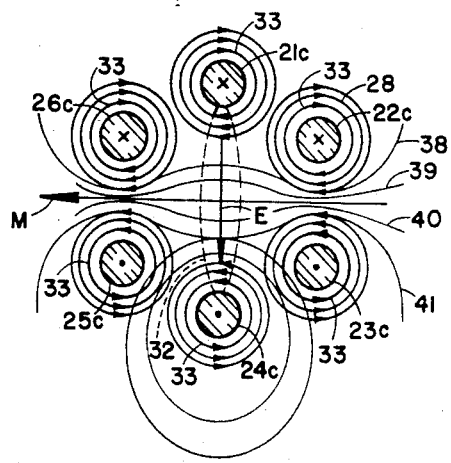
FIGURE 2 is a schematic diagram useful in explaining the operation of the FIGURE 1 system.

Referring to FIGURE 2 of the drawings there is shown schematically a section of the FIGURE 1 arc plasma device taken perpendicular with respect to the central axis 27 and passing through the bights 21c through 26c. FIGURE 2 shows in detail the magnetic influences acting in the arc plasma device 12 and their relationship to the electric field E. The electric field E and the arc 32 is shown between the electrodes 21 and 24. The "x" marks centrally located within electrodes 22 and 26 are the conventional designation for current flowing into the plane of the paper. Similarly, the dots in electrodes 23 through 25 are the conventional designation of current flowing out of the paper. The light circular lines ringing each of the electrodes represent the magnetic field generated around the electrode by the current flowing in the electrode. For clarity, a fully detailed electrode magnetic field configuration is shown with respect to electrode 24 only. It is quite obvious that the pattern shown for electrode 24 is typical. The numebr of flux lines—the magnetic field intensity—is related to the magnitude of current flowing in the conductor.

Referring to electrode 24 in FIGURE 2, the magnetic field, associated with each electrode, comprises a series of spaced rings 33 representing flux lines. The rings adjacent to the electrode 24 are circular and concentric with electrode 24. The remote rings are elongated radially reflecting the distorting effect of the magnetic fields of the adjacent electrodes 23 and 25. The spacing between adjacent flux lines is quite close near the electrode 24. The spacing between flux lines increases with increasing distance from the electrode 24.

The magnetic field M represents a composite of the individual magnetic fields generated in the electrodes 21 through 26. An approximate shape of the magnetic field M is indicated by the flux lines 38 through 41. It is obvious from Equation 1 above that the force generated by the interaction of a magnetic force M with the electric field E as shown in FIGURE 2 will generate a force into the plane of the paper.

Returning to FIGURE 1 briefly, it was stated above that the force F created for the interaction of the magnetic field M and the electric field E moves the arc in the direction of the central axis 27 and, in the case illustrated, upstream. The dotted lines 32a represent the upstream position of the arc 32. It also represents the location of the arc 32 prior to its being extinguished, either due to the action of the force F or to the drop in the electric field E caused by a drop in potential across electrodes 21 and 24.

The arc 32a has been observed to dwell in the extreme position indicated for a finite time before being extinguished. Additionally, the length of the arc 32a in relation to the arc of 32 is substantially greater due to the increased separation of electrodes in this extreme position. Thus, for a given value of current, arc 32a absorbs more power from the arc power supply 11 than does arc 32. Everything else being equal, more power reaches the gas passing through the arc and higher temperatures are achieved.

Another interesting observation is that the transition from arc 32 to arc 32a occurs very rapidly at approximately 100 to 200 feet per second, or more. This velocity can be regulated by regulating the magnitude of the magnetic field M which is controlled by the magnitude of the excitation current flowing through the electrodes 21 through 26 from the transformers 13 through 18. Under certain conditions it is possible to regulate the velocity of the working gas 28 so that a portion of the gas is made to traverse two or more arcs while it is in the vicinity of the electrodes and before it passes out of the nozzle 29 in the form of an effluent 31. A brief illustration will serve to illustrate more clearly this phenomena.

Assume the arc travels at the velocity of 200 feet per second and the working gas travels at a velocity of 100 feet per second. It follows, therefore, that gas contacting an arc 32a will, in the course of its travel towards the nozzle 29, also come in contact with a newly formed arc 32. Since each pass through an arc, the working gas 28 absorbs heat from the arc, the resulting plasma effluent 31 will have a higher enthalpy than a working gas which traverses an arc once.

Another important consideration is the orthogonal relationship between the electric field E and the magnetic field M. It has long been suspected that a rotating gas passing through an arc plasma device and a nozzle gives off more heat to the walls of the plasma device and the nozzle than does a collimated flow of gas. The interaction of a magnetic field with a transverse electric field does not create a force component which would tend to rotate the working gas or plasma.

DESCRIPTION OF THE STRUCTURE AND OPERATION OF THE FIGURE 3 EMBODIMENT

Figure 3:
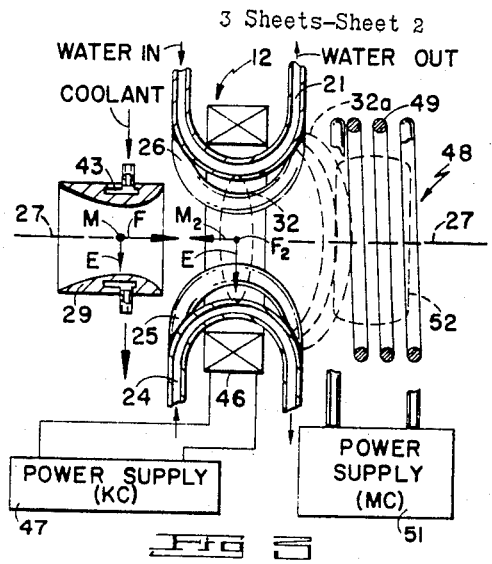
FIGURE 3 is a cross sectional diagram of an arc plasma device embodying the principles of the present invention which includes, in addition, two auxiliary heating means.

In FIGURE 3 there is a cross sectional representation of an arc plasma device embodying the principles of the present invention. The FIGURE 3 embodiment includes auxiliary magnetic means, the form and operation of which will be discussed hereinafter. Structural elements in the FIGURE 3 embodiment which are functionally equivalent to elements in the FIGURE 1 embodiment will carry the same numerical designation. For the sake of clarity, connections from the power supply means to the electrodes have been eliminated since there are no unusual requirements which have not been explained in the FIGURE 1 embodiment.

Additionally, it will be noted that the electrodes comprise tubular members bent into a preferred U-shaped configuration. The use of tubes facilitates providing cooling for the electrodes. The pronounced rounded U-shaped configuration in FIGURE 3, in contrast with the relatively rectangular schematic representation in FIGURE 1, is preferred because it forces the arc to increase in length as it progresses upstream or downstream of the center position. It will also be noted that the nozzle 29 is provided with an internal passage 43 including entrance and exit ports for a coolant.

In addition to the basic arc plasma device, there are provided means for developing an oscillating axial magnetic field comprising a coil 46 coupled to a power supply 47. The power supply 47 preferably operates at a frequency in the 10 to 100 kilocycle region. The magnetic field generated by the coil 46, designated $M_2$, acts along the center axis 27. Applying the $J \times B$ formula, Equation 1, it is clear that the force created by the interaction of the magnetic field $M_2$ with the electric field E creates a force $F_2$ which acts perpendicular to both the magnetic field $M_2$ and the electric field E and in FIGURE 3 would be directed laterally into the paper for the directions shown. The arc 32 is thus caused, by the lateral force $F_2$, to oscillate laterally at a high frequency, several kilocycles for example. Because of the lateral oscillations, a larger area of gas comes into contact with the arc than would be possible if the arc remained in a relatively fixed lateral position. Thus, more uniform heating of the gas takes place which ultimately gives rise to a more uniform plasma effluent 31. It will be noted that the force $F_2$ is at all times perpendicular to the rotating electric field E so that only a single phase power supply 47 is required.

A more uniform heat distribution may also be achieved by adding to the basic arc plasma device an induction heating system 48 comprising an induction heating coil 49 and an induction heating power supply 51. In FIGURE 3 the induction heating system 48 is shown in an upstream region adjacent to the electrodes 21 through 26. As will become clear hereinafter, the induction heating system 48 may be located in the position in which coil 46 is situated without effecting its mode of operation. As is well known, an induction heating system can be used to generate a plasma region 52 having a circular cross section.

Typically, operating frequencies of induction heating systems range in the low megacycle region, five megacycles having been used effectively for producing plasma regions. At these frequencies, current tends to concentrate and flow adjacent to the exterior surface of a conductor, the working gas in this instance; this is the well-known skin effect. Because of the skin effect, the circumference of the plasma region is more highly luminous than the center and to the naked eye gives the appearance of being a toroidal arc. In reality, however, the plasma has a circular cross section. The currents flow in a circular path within the plasma region 52. The direction of current flow is represented by an arrow 53 in FIGURE 4.

It will be noted in FIGURE 3 that the arc 32a extends into the plasma region 52. An interesting reaction takes place.

Figure 4:
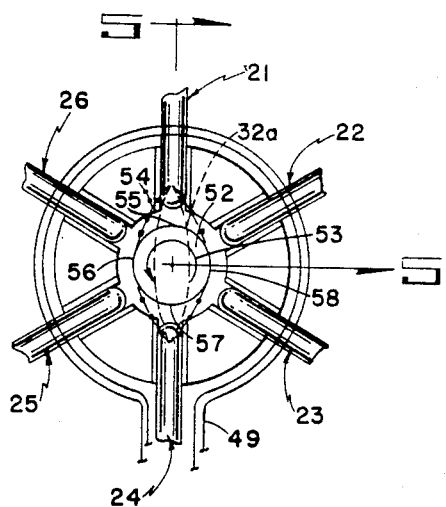
FIGURE 4 is an end view of the FIGURE 3 arc plasma device.

Typically, the arc resembles a column having a nonuniform cross section. The length of the arc—or more accurately the positive column or path taken by the arc current—is invariably much greater than its largest diameter. In FIGURES 3 and 4, because of the influence of the force F, the arc 32a resembles a bowed column.

Accompanying every arc is an enveloping luminous region commonly called the aureole. It is a high temperature plasma. Because the arc current does not pass through the aureole region, the temperature of the gas within the aureole region is substantially lower than the temperature of the gas through which the arc current flows. It is to be remembered that this is relative. The temperature of the aureole may approach 5,000 to 10,000° F., but this is in contrast with the 15,000 to 30,000° F. temperature of the plasma through which the arc current flows.

It is common knowledge that the conductivity of the plasma is related directly to its temperature. Thus, the conductivity of the plasma through which the arc flows is substantially greater than the conductivity of the plasma comprising the aureole.

Referring to FIGURE 4 of the drawings, the plasma region 52 which comprises a region of high frequency circulating currents is depicted with relation to the arc 32a and its aureole 54 shown in dot-dash outline. The current path for the circulating currents in the plasma region 52, because of skin effect, comprises in a series relationship the arcuate sections 55, 56, 57 and 58. In other words, the circulating current tends to flow through the aureole.

It follows from the preceding discussion that the conductivity of the arc positive column arcuate sections 55 and 57 is substantially higher than the conductivity of the aureole arcuate sections 56 and 58 since the former sections are in the current path of the arc 32a. Since the power absorbed by impedances is inversely related to its conductivity, the lower conductivity aureole sections 56 and 58 absorb more power from the circulating currents than do the higher arc positive column arcuate sections 55 and 57. Thus, the circulating currents in the plasma region 52 tend to raise the temperature of the aureole surrounding the arc 32a. It is now obvious that the plasma region 52 tends to narrow the temperature differences between the plasma through which the arc current flows and the surrounding aureole.

MISCELLANEOUS CONSIDERATIONS

Figure 5:
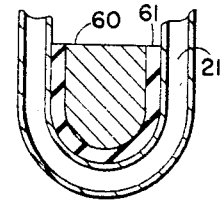
FIGURE 5 is a cross sectional representation taken along line 5—5 in FIGURE 4.

FIGURE 5 depicts a section taken along line 5—5 of FIGURE 4. More specifically, it shows a magnetic material 60 inserted within an electrode, electrode 21 for example. The magnetic material 60 is separated from the electrode by an insulating means 61. Magnetic material 60 tends to reduce the magnetic reluctance in the vicinity of an electrode surface, thus intensifying the flux density adjacent to an electrode surface. This is significant since it is known that arcs tend to root or stick to an electrode surface. Rooting leads to erosion and deterioration of the electrode and premature destruction thereof. The interaction of the magnetic field and an electric field, as was shown previously, gives rise to a mechanical force on the arc, the magnitude of which is related to the magnitude of the magnetic field. Magnetic means 60, in reducing the magnetic reluctance adjacent to the surface of an electrode, tending to intensify the flux density in the region, is responsible for intensifying the force applied to the arc thus lessening the possibility that the arc will root or stick to a specific point.

STARTING CIRCUIT

A three-phase starting circuit is depicted in FIGURE 6. It is emphasized that the FIGURE 6 circuit is provided for illustrative purposes only and is not to be considered as a limitation. Starting circuit 65 comprises three identical transformers 73 through 75 which include primary windings 73a through 75a. These may be connected to a three-phase power supply system in either the conventional star or delta arrangements. The transformers 73 through 75 also include center tapped secondaries 73b through 75b which are coupled to spark gaps 77 through 79 respectively. As seen in FIGURE 6, each of the spark gaps 77 through 79 is coupled through one of the condensers 85 through 90 to a common bus 81. Since the circuits comprising transformers 73 through 75 are identical, only one, relating to transformer 73, will be described in detail.

The spark gap 77 comprises a pair of electrodes 77a and 77b which are spaced from a center electrode 77c. Electrodes 77a and 77b are coupled to the terminal ends of the secondary 73b whereas electrode 77c is coupled to the center tap of secondary winding 73b and also to ground.

When the potential on electrode 77a or 77b exceeds a predetermined level, a spark discharge occurs to electrode 77c. The spark discharge generates a transient electrical signal. It will also be noted in FIGURE 6 that each of the electrodes 21 through 26, depicted by arrows, are coupled to the common bus 81 by one of the condensers 91 through 96.

It will be especially noted that the signal coupled to the electrodes 21 through 26 occurs between the electrodes 21 through 26 and ground. Referring to FIGURE 1 very briefly, this would correspond to a signal between the electrodes 21 through 26 and the nozzle 29 which is grounded. It is assumed that the potential of the transient electrical signal is sufficiently high to cause an arc discharge to occur across one of the electrodes 21 through 26 and the nozzle. This electric discharge creates an ionized region—a conducting path—in the vicinity of the electrodes and an arc discharge develops between a pair of electrodes, typically in the direction of the maximum electric field intensity E in the manner described heretofore. As E rotates, arcs appear across different electrodes, in sequence, and in succession, giving rise to a rotating arc effect.

To prevent high frequency transients from entering the power means, each of the electrodes 21 through 26 is isolated from the arc power supply phases I–VI by a filter network 101 through 106. Referring to FIGURE 6 network 101, it is seen that it comprises a conventional two section L-type filter choke input.

ILLUSTRATIVE ARC SUPPLY AND EXCITATION SUPPLY SYSTEM

Since, in the practice of the invention, there is preferably provided an electric rotating field E and a rotating magnetic field M which is displaced from the electric field E by 90°, care must be taken to provide an arc supply system and an excitation supply system having the proper phase relationship. In FIGURE 7, one such system is illustrated. It is emphasized that the FIGURE 7 system is one of several types of systems that will perform satisfactorily. It is quite obvious that the proper phase relationship between the electric field E and the magnetic field M may be achieved through other power supply configurations.

Briefly, the arc power supply primary comprises a three-phase delta system coupled to a three-phase power distribution means designated A', B' and C'. Each individual primary phase is further identified by the letters of the power distribution means across which it is connected. For example, (A'–C') joins phase A' puls C' of the supply means.

As depicted in FIGURE 7, the arc supply secondary comprises a conventional six phase star configuration having a common junction which is at ground potential. The secondary windings are clearly identified with a particular primary winding.

Digressing briefly, it will be noted that there is a dot associated with each winding in the FIGURE 7 system. This dot is a conventional phasing notation. Briefly, the ends of a primary and associated secondary winding that include the dot are in phase, that is to say, when the dotted end of the primary is increasing in voltage with respect to the undotted end, the dotted end of its secondary is increasing in voltage with respect to the undotted end of the secondary.

Referring to the excitation supply, it will be noted that the primary is also connected in a delta configuration and coupled to a three-phase power distribution means identified A, B, and C. In this case, in contrast to the arc supply means, each primary includes two separate and distinct secondaries which carry the same notation as the primary with which they are associated. It will also be noted that these secondaries are phased in a prescribed manner.

A further consideration with regard to properly phasing the excitation supply and the arc supply of the particular experimental set-up shown in FIGURE 7 was the fact that the current in the excitation secondary windings lagged the primary voltage by 30°. Additionally, the distribution supply voltages A, B, and C lagged the distribution supply voltages A', B', and C' by 30°.

The FIGURE 7 circuit phased as depicted and with the phase relationships outlined just above, generated a rotating electric field E and a rotating magnetic field M that had a constant phase difference of 90°.

It is quite obvious from the foregoing that the arc plasma system 10 comprises an efficient and versatile plasma device. In particular, the movement of the arc parallel to the direction of the working gas, central axis 27 for example, can be independently adjusted by adjusting the current flowing into and out of the electrodes 21 through 26. Additionally, by adjusting the arc velocity, a portion of the working gas can be made to pass through two and possibly more arcs in the vicinity of the electrodes 21 through 26.

Other significant features are the provision of an auxiliary oscillating magnetic field and a circulating current to interact with an arc, both tending to produce a uniform heat or enthalpy, distribution in the plasma effluent.

It has also been pointed out that electrode life is increased appreciably over prior art and direct current devices by causing the arc to travel over the surface of an electrode. In this connection the electrode configuration is such that the arc must lengthen as it moves away from the center position. This makes it possible to supply additional power to the arc for a specific current value.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. An arc plasma system comprising: means for providing a stream of fluid; means for generating a succession of shifting arcs in said stream of fluid; and means for generating a magnetic field shifting with said arcs which interacts with said arcs tending to move said arcs longitudinally through said stream of fluid.

2. An arc plasma system as described in claim 1 which includes, in addition, means for generating an oscillating magnetic field tending to oscillate said arcs laterally to said stream of fluid.

3. An arc plasma system as described in claim 1 which includes, in addition, means for generating a region of circulating currents in said stream of fluid.

4. An arc plasma system as described in claim 1 which includes, in addition, means for generating an oscillating magnetic field tending to oscillate said arcs laterally to said stream of fluid; and means for generating a region of circulating currents in said stream of fluid.

5. An arc plasma system comprising: spaced electrode means; means for generating arcs in a predetermined sequence across at least a pair of said electrodes; means for supplying current to said electrodes for generating a moving magnetic field which interacts with said arcs and is phased to have at least a component perpendicular to said arcs; and means for providing fluid through which said arcs flow.

6. An arc plasma system comprising: spaced electrode means disposed about an axis; means for generating arcs in succession across at least a pair of said electrodes, successive arcs being angularly displaced from previous arcs with respect to the axis; means for supplying current to said electrodes for generating a rotating magnetic field about the axis which interacts with said arcs and is phased to have at least a component perpendicular to said arcs and said axis; and means for supplying a fluid through which said arcs flow.

7. An arc plasma system comprising: spaced electrode means; means for generating arcs in succession across at least a pair of said electrodes; means for supplying current to said electrodes for generating a moving magnetic field which interacts with said arcs and is further phased to have at least a component perpendicular to said arcs; means for providing a fluid through which said arcs flow; and means for generating an oscillating magnetic field for oscillating said arcs.

8. An arc plasma system as described in claim 7 in which said second magnetic field comprises a high frequency time varying magnetic field.

9. An arc plasma system comprising: spaced electrode means; means for generating arcs in succession across at least a pair of said electrodes; means for supplying current to said electrodes for generating a moving field which interacts with said arcs and is further phased to have at least a component perpendicular to said arcs; means for providing a fluid through which said arcs flow; and means for generating circular currents flowing perpendicular to said arcs and interacting therewith.

10. An arc plasma system as defined in claim 9 in which said circular currents are generated by an induction heating means.

11. An arc plasma system as defined in claim 9 in which the circular electric currents flow in a plasma generated by an induction heating means.

12. An arc plasma system comprising: spaced electrode means; means for generating arcs in succession across at least a pair of said electrodes; means for supplying current to said electrodes for generating a moving field which interacts with said arcs and is further phased to have at least a component perpendicular to said arcs; means for providing a fluid through which said arcs flow; means for generating an oscillating magnetic field for oscillating said arcs; and means for generating circular currents which interact with said arcs.

13. An arc plasma system comprising: spaced electrode means disposed about an axis, said electrodes being dimensioned so that the spacing between electrodes increases in an axial direction; means for generating arcs in succession, successive arcs being angularly displaced from previous arcs with respect to the axis; means for supplying current to said electrodes for generating a moving magnetic field which interacts with the arcs and is also phased to have at least a component perpendicular to said arcs; and means for providing a fluid through which said arcs flow.

14. An arc plasma system comprising: spaced electrode means disposed adjacent to an axis, said electrodes being dimensioned so that the spacing between electrodes increases in an axial direction; means for generating arcs in succession across at least a pair of said electrodes, successive arcs being angularly displaced from previous arcs with respect to the axis; means for supplying current to said electrodes for generating a moving magnetic field which interacts with the arcs and is phased to have at least a component perpendicular to said arcs; means for supplying a fluid through which said arcs flow; and means for generating circular currents flowing perpendicular to the axis.

15. An arc plasma system comprising: means for supplying a stream of fluid; $n$ electrode means, $n$ being an integer equal to or more than two, uniformly spaced with respect to adjacent electrodes, a portion of said electrodes extending in the direction of motion of said stream of fluid in communication therewith; $n$ phase arc power supply means having each phase coupled to one of said $n$ electrodes; and an $n$ phase excitation supply means, each of said phases being coupled to one of said $n$ electrodes for supplying current into and out of said electrode.

16. An arc plasma system as described in claim 15 in which said arc power supply means and said phase excitation supply means have a predetermined and substantially constant phase separation.

17. An arc plasma device comprising: a plurality of electrodes disposed about an axis, each electrode including an axial portion, means for coupling the electrode to an arc power supply, electrical current input and output means at opposite ends of said axial portion; and means for supplying a stream of fluid between said electrodes in communication therewith.

18. An arc plasma device as described in claim 17 which includes, in addition, means for inducing a region of circulating currents in said fluid.

19. An arc plasma device as described in claim 18 which includes, in addition, means for supplying an oscillating axial magnetic field.

20. An arc plasma device comprising a plurality of electrodes disposed in a spaced relationship about an axis, each electrode including an axial portion, means for coupling the electrode to an arc power supply, and current input and output means, the spacing between axial portions of said electrodes increasing in an axial direction; and means for supplying a stream of fluid between said electrodes and in communication therewith.

21. An arc plasma device comprising: $n$ electrodes, $n$ being an integer being equal to or more than two, uniformly spaced with respect to adjacent electrodes and disposed in a circular configuration about an axis, each of said electrodes having an axial portion and including means for coupling the electrode to an arc power supply and to an electrical current supply means passing current through said axial portion; and means for supplying an axial stream of fluid between said electrodes in communication therewith.

22. An arc plasma device as described in claim 21, in which the spacing between axial portions of said electrodes diverges in an axial direction.

23. An arc plasma device as described in claim 21 which includes, in addition, means for inducing a region of circulating currents in said fluid.

24. An arc plasma device as described in claim 23 which includes, in addition, means for supplying an oscillating axial magnetic field.

25. An arc plasma device comprising: a plurality of U-shaped electrodes disposed about an axis, the bight of each electrode being arcuate and axially oriented, each electrode including means for coupling the electrode to an arc power supply and electrical current input and output means at opposite ends of said bight; and means for supplying a stream of fluid between said electrodes in communication therewith.

26. An arc plasma device as described in claim 25 in which said arcuate bight interconnects substantially radially extending fingers.

27. An arc plasma device as described in claim 25 which includes, in addition, means for inducing a region of circulating currents in said fluid.

28. An arc plasma device as described in claim 27 which includes, in addition, means for supplying an oscillating axial magnetic field.

29. An arc plasma system comprising:
spaced electrode means;
means for generating a succession of arcs, successive arcs flowing between different electrodes;
means for providing a stream of fluid through which said arcs flow; and
means for providing a moving magnetic field which moves in synchronism with the movement of said arcs for maintaining at least a component perpendicular to said arcs, said magnetic field interacting with said arcs for moving said arcs longitudinally through said stream of fluid.

References Cited by the Examiner
UNITED STATES PATENTS

| | | | |
|---|---|---|---|
| 2,826,708 | 3/1958 | Foster | 313—321 |
| 2,850,662 | 9/1958 | Gilruth et al. | 315—111 X |
| 2,964,678 | 12/1960 | Reid | 315—111 |

JAMES W. LAWRENCE, *Primary Examiner.*

RALPH G. NILSON, C. R. CAMPBELL,
*Assistant Examiners.*